US012080494B2

(12) United States Patent
Hui et al.

(10) Patent No.: US 12,080,494 B2
(45) Date of Patent: Sep. 3, 2024

(54) SWITCH AUGMENTATION

(71) Applicant: NovaVolta Limited, Hong Kong (HK)

(72) Inventors: Chi Ho Hui, Hong Kong (HK); Kei Wing Nelson Ho, Hong Kong (HK)

(73) Assignee: NovaVolta Limited, Hong Kong (CN)

( * ) Notice: Subject to any disclaimer, the term of this patent is extended or adjusted under 35 U.S.C. 154(b) by 0 days.

(21) Appl. No.: 17/895,056

(22) Filed: Aug. 24, 2022

(65) Prior Publication Data

US 2024/0071697 A1 Feb. 29, 2024

(51) Int. Cl.
*H01H 23/16* (2006.01)
*H01H 23/04* (2006.01)

(52) U.S. Cl.
CPC ............ *H01H 23/16* (2013.01); *H01H 23/04* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

| | | | | |
|---|---|---|---|---|
| 2015/0228426 A1* | 8/2015 | Romano | .................. | H01H 3/22 200/331 |
| 2020/0288559 A1* | 9/2020 | Mann | .................. | H05B 47/105 |

* cited by examiner

*Primary Examiner* — Ahmed M Saeed
(74) *Attorney, Agent, or Firm* — W&P International LC; Wai P. Leung

(57) ABSTRACT

A light switch adapter with slight modification to an existing wall light switch turns the existing wall light switch into a smart device by replacing the existing screws with elongated screws. To further secure the adaptation, each of the elongated screw may contain an adapter screw head or fastener or knobbed protrusion that firmly couples the light switch adapter through an opening of the rear side of the light switch adapter. In another embodiment, the opening contains or shaped as a circlip or a C-clip that allows the adapter screw head snap into the opening securely.

18 Claims, 5 Drawing Sheets

SWITCH AUGMENTATION

FIELD OF THE INVENTION

The presently disclosed technology generally relates to light switch adapters, and more specifically to adapters of enabling traditional light switches to smart switches.

BACKGROUND OF THE DISCLOSED TECHNOLOGY

This invention relates to the augmentation of mechanisms, particularly switch mechanisms such as wall light switches, but also other rocking, toggling, sliding and rotating mechanisms.

The smart switch market is growing, leveraging ubiquitous wireless Internet connectivity to enable remote control of lighting, power sockets, locks, blinds, curtains and other devices in domestic and business environments. Installation of smart switches requires an electrician to remove the existing switch before fitting and wiring in the new smart switch.

Hygiene concerns are also increasing worldwide, and touchless switches are seen as desirable, particularly in public areas. Again, however, replacing existing switches with touchless switches is a skilled job.

U.S. Pat. No. 9,418,802 describes a device to control a pre-existing fight switch. The device attaches to a light switch by internal magnets at locations corresponding to the magnetic screw heads of the light switch. This makes installation a simple process. The device can be wirelessly controlled and works with both toggle light switches and rocker light switches. Additional functionalities include timed and automated operations and the ability to send data to and from an external wireless gateway device containing Wi-Fi and (Bluetooth Low Energy) BLE modules, allowing for control and status information of the device from a remote location.

Although this device enables rapid adaptation of existing light switches, the device is only attached via magnets so can be easily knocked off or can be instantly and trivially removed if used in public areas. Also, the internal switching mechanism and other components are bulky and the device is therefore several centimeters thick, making it aesthetically unappealing. Finally, the smart functionality is limited.

It is desirable to provide a way of augmenting light switches which addresses these and other shortcomings in the prior art.

SUMMARY OF THE INVENTION

Embodiments of the invention provide a light switch adapter that is aesthetically appealing and can be installed without the need to remove and replace existing wall light switches. A user performs an easy modification of the existing light switch by replacing the existing screws (usually just two screws on the majority of existing light switch designs) with elongated screws. Then, the light switch adapter simply slides onto the elongated screws to augment the existing light switch. To further secure the adaptation, each of the elongated screw may contain an adapter screw head or fastener that firmly couples the light switch adapter through an opening of the rear side of the light switch adapter. Optionally, the opening contains or shaped as a circlip or a C-clip that allows the adapter screw head snap into the opening securely. The adapter contains a mechanical actuator controlled by a micro-controller to flip the existing switch on and off. Advantageously, the elongated screws, as mentioned above, provide an easy yet secure means for mounting the adapter. Once attached, the adapter cannot be as trivially or accidentally removed as solutions using magnets. Nevertheless, a user can quickly remove the adapter if necessary to access the underlying switch.

In another embodiment, the adapter uses a novel design for its internal actuator mechanical design that allows it to fit into a less than 1 cm thick low-profile casing, contrary to current designs with casing of much higher thickness.

The inclusion of a proximity sensor enables the switch to be operated without physically touching the surface of the adapter. This is useful in multiple circumstances and may also be helpful in reducing the users' chance in getting viral and bacterial infection and cross-contamination.

The adapter uses infra-red sensors to determine the on/off state of the switch, rather than using traditional mechanical switching mechanisms that would otherwise significantly reduce the chance of malfunctioning due to excessive use over time. This permits the adapter to accurately determine when to stop the actuator motion when the target state is reached, preventing the application of unnecessary force that would waste energy and potentially damage the adapter or the underlying switch.

The adapter has smart functionality and is capable of acting as a universal infra-red learning remote for controlling other devices such as home appliances. This is advantageous since wall switches are generally mounted at a suitable height for IR remote signal transmission.

The adapter uses audible sound for transferring pairing data messages between devices with a speaker and/or a microphone. With low speaker volumes, the effective distance of the communication is deliberately set to be approximately 10 cm or less. This prevents "man in the middle" attacks during pairing or bonding of smart devices.

BRIEF DESCRIPTION OF THE DRAWINGS

Embodiments of the invention and a description of various advantageous, alternative and optional features to aid understanding of the invention will now be described by way of an example only and with reference to the accompanying drawings in which.

DETAILED DESCRIPTION OF EMBODIMENTS OF THE DISCLOSED TECHNOLOGY

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Figure 1:
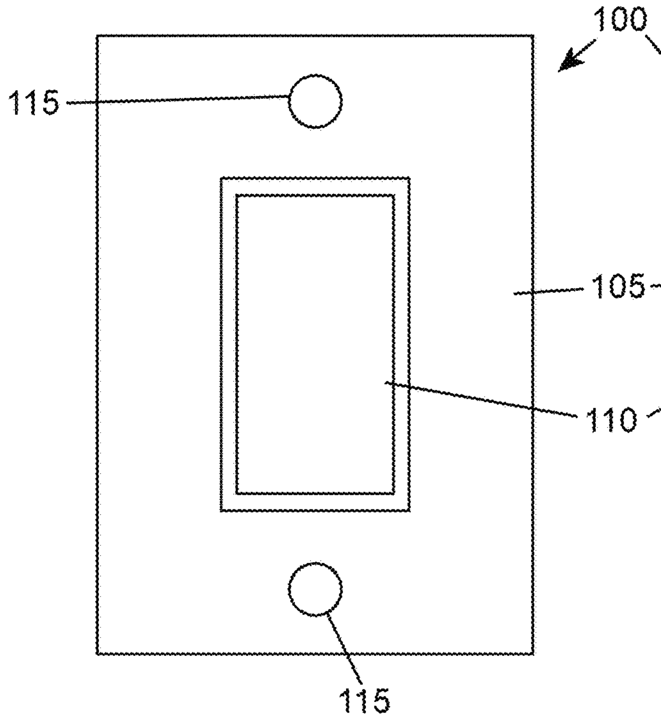
FIG. 1 illustrates a typical light switch.
Figure 2:
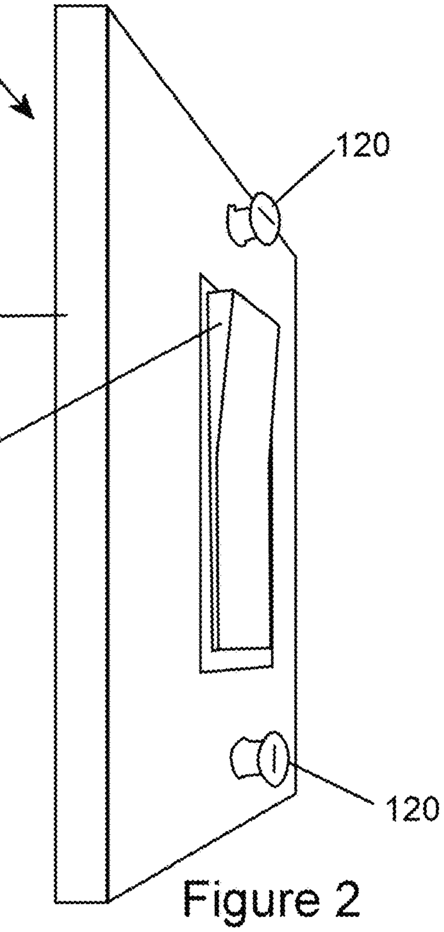
FIG. 2 is a side view of a typical light switch with replacement screws.

FIGS. 1 and 2 illustrate a typical light switch 100. The light switch 100 has a base 105 and a switch 110. The switch in this case is a rocker switch, but it will be appreciated that embodiments of the invention can be constructed that work with a wide range of switches, switch mechanisms and mechanical actuators operated with either linear or rotational movement. Examples include, without limitation, toggle switches, latches, deadbolts and so forth.

The light switch base 105 is attached to a wall with screws that pass through screw holes 115. Most designs of light switch have two screw holes 115 aligned either horizontally or vertically, though embodiments of the invention may be adapted to any number or arrangement of screw holes 115.

In FIG. 2, the light switch 100 is illustrated with the usual screws replaced with adapter screws 120. Each adapter screw 120 is elongated relative to the usual screws so that the adapter screw 120 still secures the light switch 100 to the wall or other surface, but the screw head or other knob is spaced away from the light switch base 105 to provide a mounting point. In one implementation, adapter screw 120 includes an adapter screw head that may serve as a fastener that firmly couples the adapter 200. Said adapter screw head may further include a groove that further secures the coupling between the light switch 100 and adapter 200.

Figure 3:
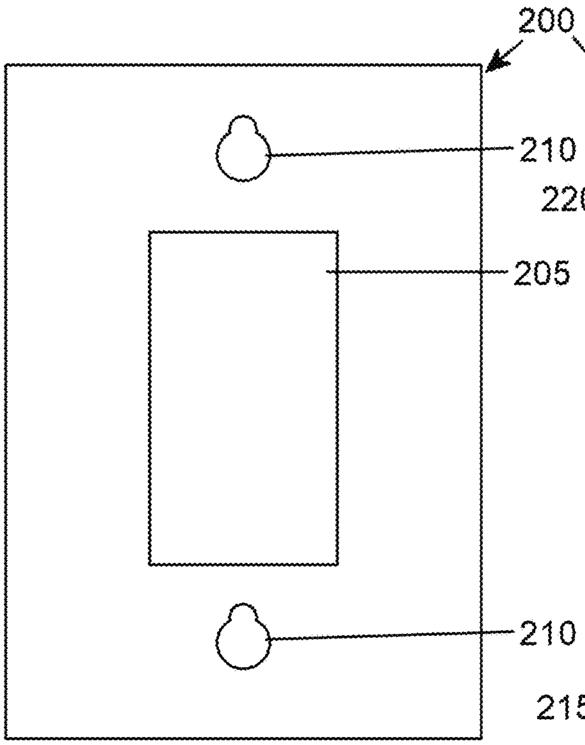
FIG. 3 is a view of the rear of a light switch adapter.

An adapter 200 embodying the present invention is suitable for augmenting a switch mechanism such as the light switch 100 of FIGS. 1 and 2. FIG. 3 is a rear view of the adapter 200, presenting a rear surface that is to be placed against the light switch 100. The rear of the adapter 200 has a switch actuator 205. In this embodiment, the switch actuator 205 is a rocker actuating plate. Different shapes and designs of switch actuator may be used depending on the light switch or other mechanism that is being augmented. In use, as will be described below, the switch actuator 205 actuates or operates the switch 110 of the light switch 100.

The rear of the adapter 200 also has two slots or openings, keyhole slots 210, each matching the position of the two respective adapter screws 120 when adapter 200 and switch 110 is coupled together. The position and number of the keyhole slots may be varied depending upon the design of the switch or actuator that the adapter is intended to be used with. In one embodiment, keyhole slot 210 contains or shaped as a circlip or C-clip (optionally, built into the rear surface of adapter 200), which allows the adapter screw 120 containing a knobbed protrusion (optionally with a head with groove) snap into keyhole slot 210 (preferably into the circlip or C-clip) to lock the adapter 200 in position. Further, both keyhole slots 210 are positioned to ensure that the switch actuator 205 is properly aligned with the switch 110 of the light switch 100 when the adapter is in position on the switch 100.

Figure 4:
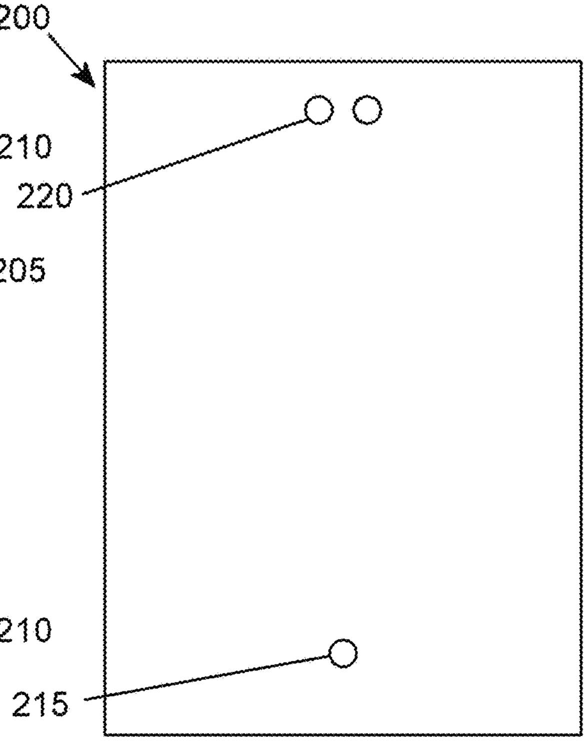
FIG. 4 is a view of the front of a light switch adapter.
Figure 5:
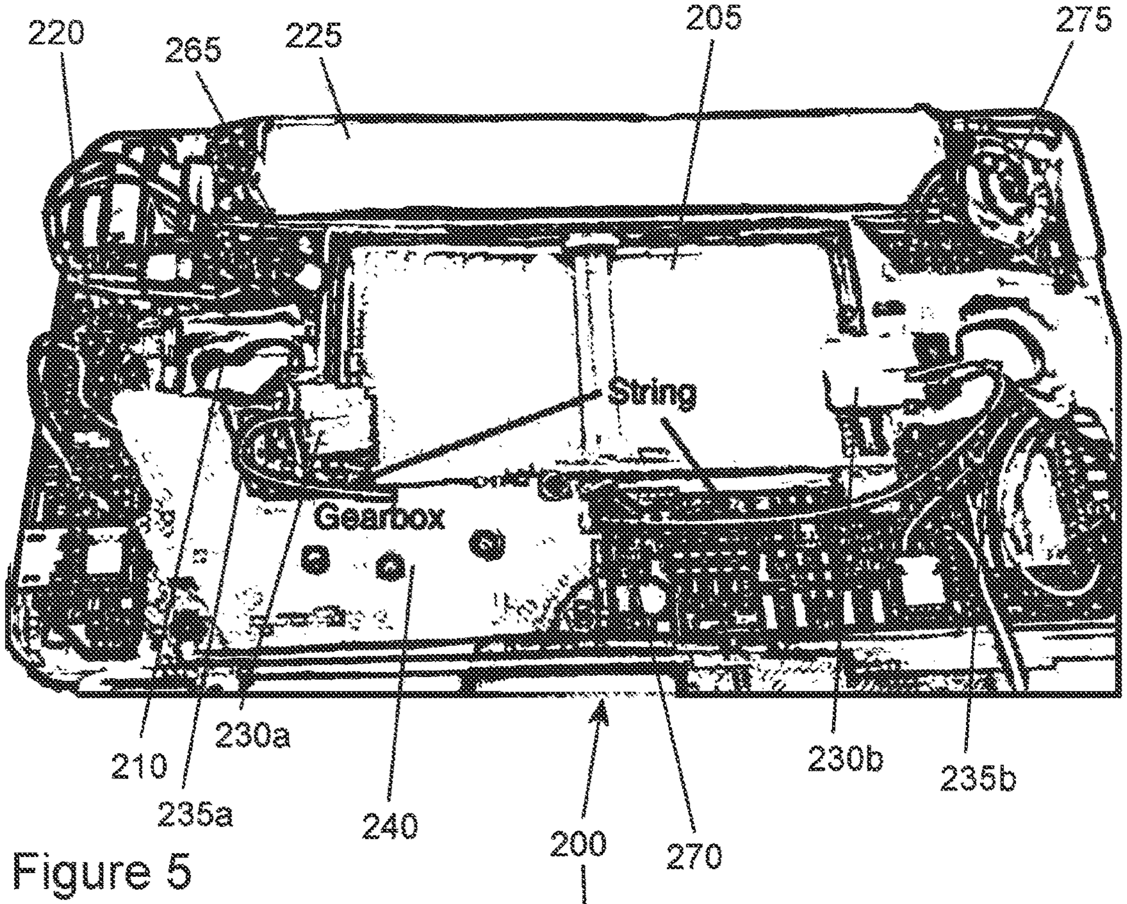
FIG. 5 is a view of the interior of a light switch adapter.

FIG. 4 is a front view of the adapter 200, presenting a front surface that enables interaction with a user and other devices. Interaction may be via a mechanical switch or touch sensor, but the adapter is advantageously operated using touchless interaction. When operated or activated, the adapter actuates the underlying switch 110. FIG. 5 is a view of the interior of the adapter 200, with the front surface removed, showing the switch actuator 205 and keyhole slots 210 visible from the rear of the adapter 200. The infra-red LED 220 visible from the front of the adapter 200 is also shown in FIG. 5.

Power for the adapter 200 is provided by a battery 225. Any suitable battery may be used, but advantageously the battery is a slim, rechargeable lithium-ion battery or lithium-ion polymer battery. Such batteries are smaller than typical AA batteries to minimize the thickness of the adapter 200 (i.e., the distance between the rear surface and the front surface), and more environmentally friendly.

The switch actuator 205 is controlled by a first lever **230*a* and a second lever 230*b*, one at each end of the switch actuator 205. The levers 230*a*,230*b* are class levers and each is connected to a respective first end 235*a* and second end 235*b* of a length of string. When the first end 235*a* of the string is pulled taut by a gearbox mechanism 240, and tension released on the second end 235*b*, the first lever 230*a* presses on the switch actuator 205, and vice versa. This switches the switch actuator 205 and consequently the underlying switch 110**.

Figure 6:
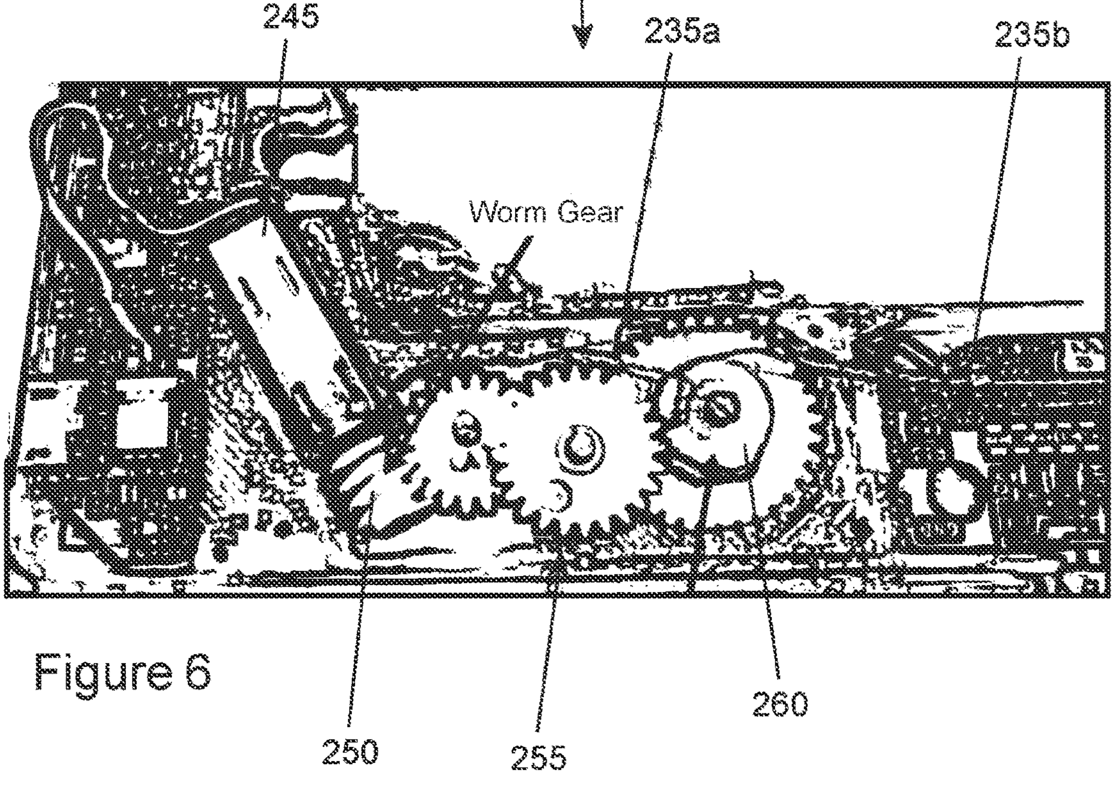
FIG. 6 is a detail view of a gearbox inside a light switch adapter.

FIG. 6 shows the interior detail of the gearbox mechanism 240 with a gearbox cover shown in FIG. 5 removed. The gearbox mechanism 240 comprises a bi-directional electrical motor 245 which rotates a worm gear 250. The worm gear 250 is connected via a transmission 255, the transmission 255 comprising at least one reducing gear, to a string spool or bobbin 260 which rotates to pull taut either the first end **235*a* or the second end 235*b* of the string. It will be understood that the string or more than one string can be arranged in different ways to provide different motive forces. For example, one or more strings could be arranged so that pulling the string in a first direction provides a clockwise turning force whereas pulling the string (or a second string) in a second direction provides an anti-clockwise turning force. The adapter 200** can therefore be configured to work with rotating switch mechanisms such as rotational dimmer switches.

Embodiments of the invention provide an adapter 200 having a very low profile—i.e., the distance between the rear surface and the front surface is small so that the adapter does not stick out a significant distance from the wall switch. In order to achieve a low-profile design, various gearbox designs were tested, using combinations of simple spur gears to directly control the switch actuator 205. No solution that was both sufficiently low-profile and low-noise could be found and yet provide enough force to actuate the switch 110. The innovative solution to this problem was the unconventional system of FIG. 6 using a worm gear 250 to redirect the motion of the motor into the plane of the adapter 200, and driving a string spool 260 to drive levers **230*a*,230*b* at opposite ends of the switch actuator 205. In this arrangement, the largest component is the motor 245, a miniature K20 motor having a thickness of 5 mm is advantageously used, driving by a miniature driver such as a Texas Instruments® DRV8837. This enables the adapter 200** to be no more than 9 mm thick.

The worm gear 250 is setup in that it only allows force to go from motor 245 to the worm gear 250 and subsequently spool 260. It helps release tension in the string and prevents unnecessary stress in the system. To detect the end of the switch actuating cycle, an internal IR LED 265 and an internal IR receiver 270 are provided on opposing sides of the switch actuator 205, as illustrated more clearly in FIGS. 7 and 8.

Figure 7:
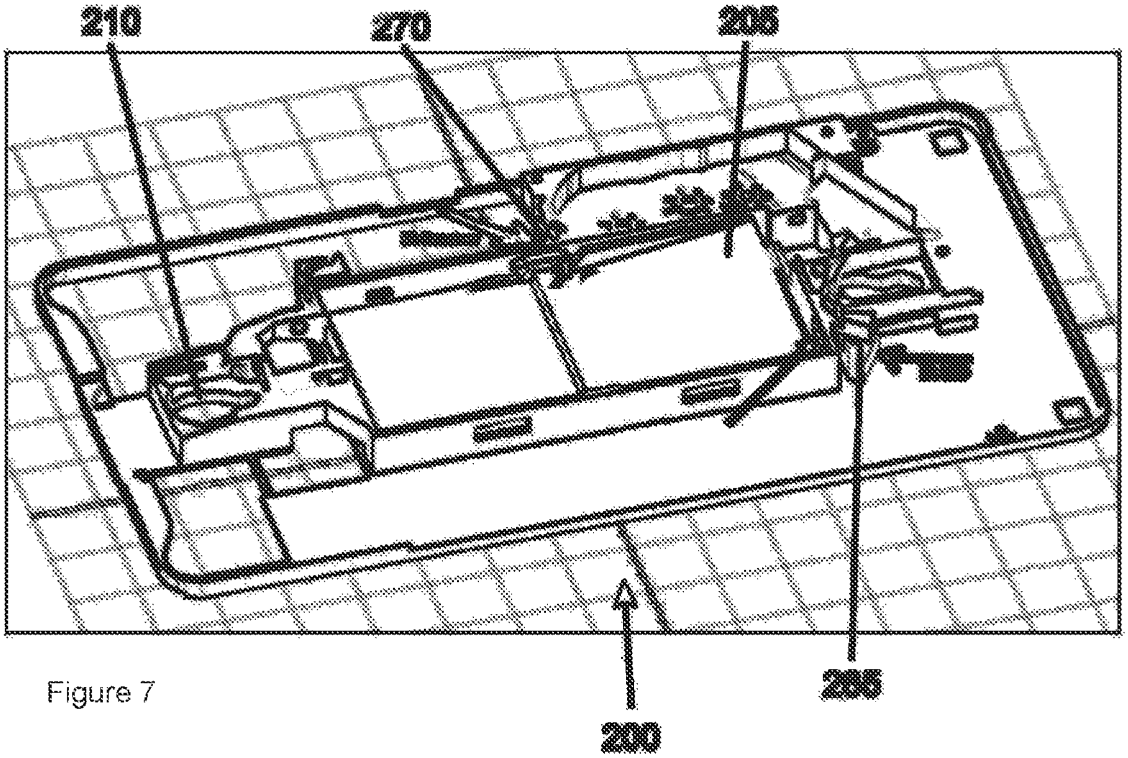
FIGS. 7 and 8 are views of the interior of a light switch adapter with a rocking switch actuator.
Figure 8:
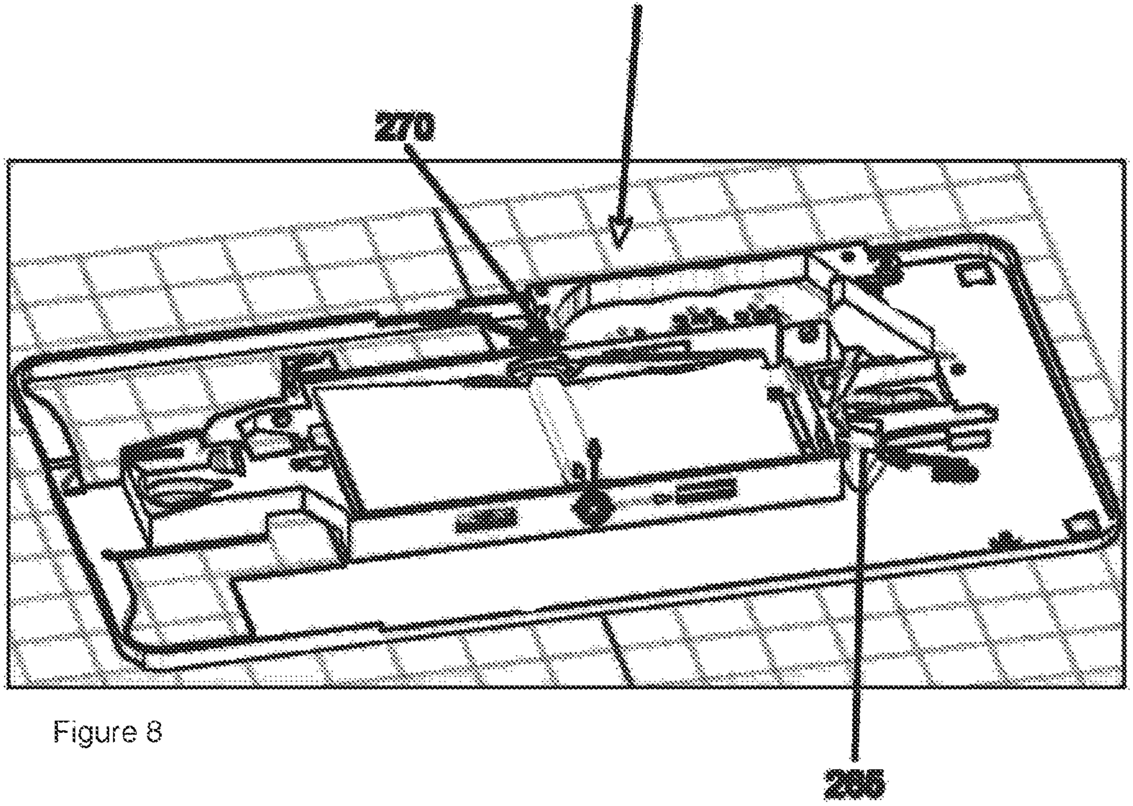

FIG. 7 illustrates part of the interior of the adapter 200 with the switch actuator 205 in a first position, e.g. the "off" position. In the off position, the switch actuator 205 blocks light from the internal IR LED 265 from reaching the internal IR receiver 270, FIG. 8 illustrates part of the interior of the adapter 200 with the switch actuator 205 in a second position, e.g. the “on” position. When the switch actuator 205 is in the on position, there is an open path for fight from the internal IR LED 265 to reach the IR receiver 270. The IR receiver 270 can therefore provide an indication, used by the motor 245, of whether the switch actuator 205 is in the on or off position. Using IR sensors is advantageous compared to mechanical sensors since they can accurately determine state changes of the switch actuator 205 without causing issues concerning physical distortion due to wear and tear over time. Mechanical switches also wear out over time and require more space.

The string is any suitable, substantially inelastic, flexible filament. Multiple types of string have been tested, including Kevlar, Nylon, single strand, multi-strand, multi-strand braided material before coming up with an acceptable solution that can withstand repeated on-off cycles. Prototypes have been tested over 100,000 cycles without observable wear and tear. As an embodiment, one type of acceptable string is a multi-strand braided micro filament fishing line that can withstanding 50 lbs at 0.32 mm diameter Embodiments of the invention also reduce the on-going carbon footprint of the adapter 200. In addition to using a rechargeable lithium-ion battery 225, low power components are used such that the adapter can run for several months on a single charge. In a standard design, an “always-on” proximity sensor using an IR LED (such as a Broadcom® APDS-9930) consumes significant power. This problem has been solved by using a capacitive sensor to control power to the proximity sensor. The capacitive sensor is deliberately over tuned to detect any nearby changes in electric field. This makes the capacitive sensor over-reactive so it cannot be used as a reliable sensor by itself. Instead, if a change is detected, the IR LED in the proximity sensor is enabled to check for an actual proximity object and the switch actuator 205 is operated only if the presence of an object is confirmed by the proximity sensor. Even with the understanding that the capacitive sensor over-reacts, this approach lowers the power consumption of the proximity sensor without reducing accuracy.

Figure 9:
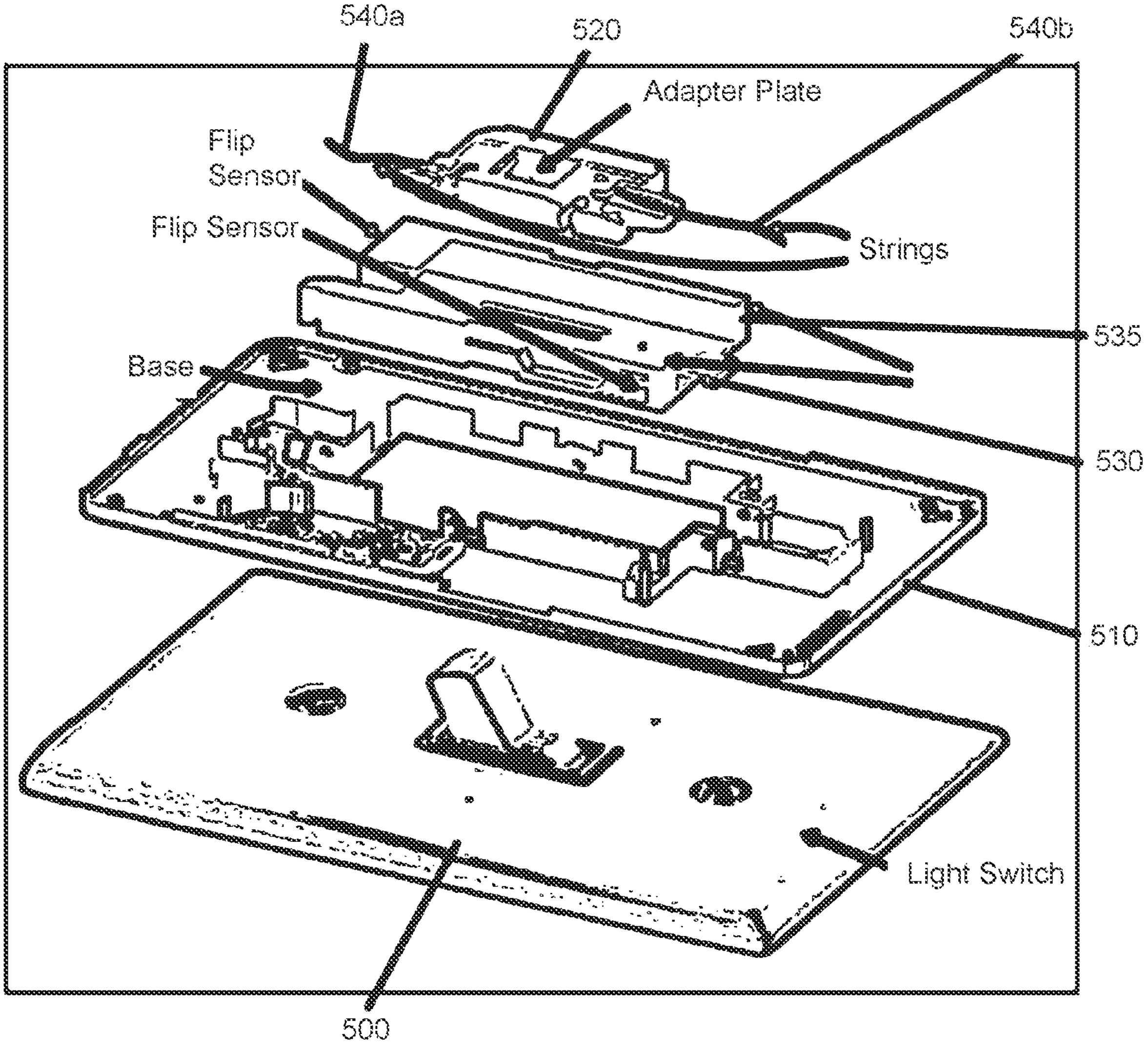
FIG. 9 is an exploded view of the light switch adapter that can be adaptable to a traditional mechanical light switch, consistent with an embodiment of the present invention.

FIG. 9 is an exploded view illustrating how the general principles of the rocker light switch 100 embodiment above can be applied to other types of switch mechanism. A toggle light switch 500 is illustrated as an example, but the arrangement of FIG. 9 can be applied to a range of sliding switches or rotational switches or mechanisms.

A base plate 510 of an adapter is similar to the rear surface of the adapter 200 illustrated in FIGS. 3 to 8 and can be similarly secured to a suitably adapted switch using keyhole slots. Instead of a rocking switch actuator 205, the adapter of FIG. 9 comprises a slider 520 and slider holder 530. The slider holder 530 is attached to the base plate 510 and has two sliding tracks 535 for receiving the slider 520 and permitting the slider to move laterally within the slider holder 530 relative to the base plate 510. Two ends 540*a*, 540*b* of a piece of string are attached to either end of the slider 520. When either a first end 540*a* or a second end 540*b* of the string is pulled taut (using a gearbox mechanism 240 as described above) the slider 520 slides within the slider holder 530 between an on position and an off position. The slider 520 fits over the toggle of the light switch 500 or is otherwise attached to a switch or other actuator such that sliding of the slider 520 operates the switch.

When using IR as position sensing, sensors are used. Two sets of sensors are deployed, one for lever 230*a* and the other for lever 230*b*. As an example, sensor such as the IR LED 265 and IR receiver 270, as described above, are provided on the slider holder 530 to detect when the slider 520 has moved to either of the on position or the off position in order to control a motor, such as the motor 245, as described above.

Figure 10:
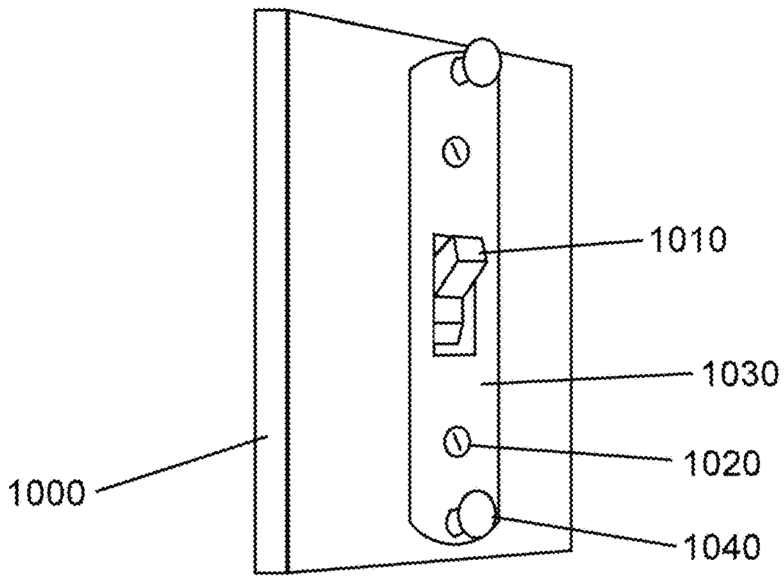
FIG. 10 illustrates an adapter connector plate attached to a light switch.

FIG. 10 illustrates an alternative way of mounting an adapter 200 (not shown in FIG. 10) onto a switch 1000. The switch 1000 in FIG. 10 is a toggle type light switch having a toggle 1010, but this alternative mounting can be used on a range of different switches and actuators. The switch 1000 is attached to a wall or other surface via screws 1020.

Instead of using replacement, elongated screws to mount an adapter 200 on the switch 1000, an adapter plate 1030 having two or more mounting knobs 1040 is provided. The adapter plate 1030 is sized and shaped to fit over the switch 1000 and the toggle 1010, and has screw holes corresponding with the position of the screws 1020 on the switch. To fit the adapter plate 1030, the screws 1020 in the switch 1000 are removed, then the adapter plate 1030 is positioned over the switch 1000, and the same screws 1020 can be used to screw the adapter plate 1030 to the switch 1000 and to secure the switch to the wall. The mounting knobs 1040 on the adapter plate 1030 are received by keyhole slots 210 in the adapter 200 as described above. A single piece adapter plate 1030 simplified proper alignment of the mounting knobs 1040 with the switch 1000 and the adapter, but an adapter plate 1030 having several independent pieces that are individually screwed to the switch 1000 to correctly position the mounting knobs 1040 may also be used.

Figure 11:
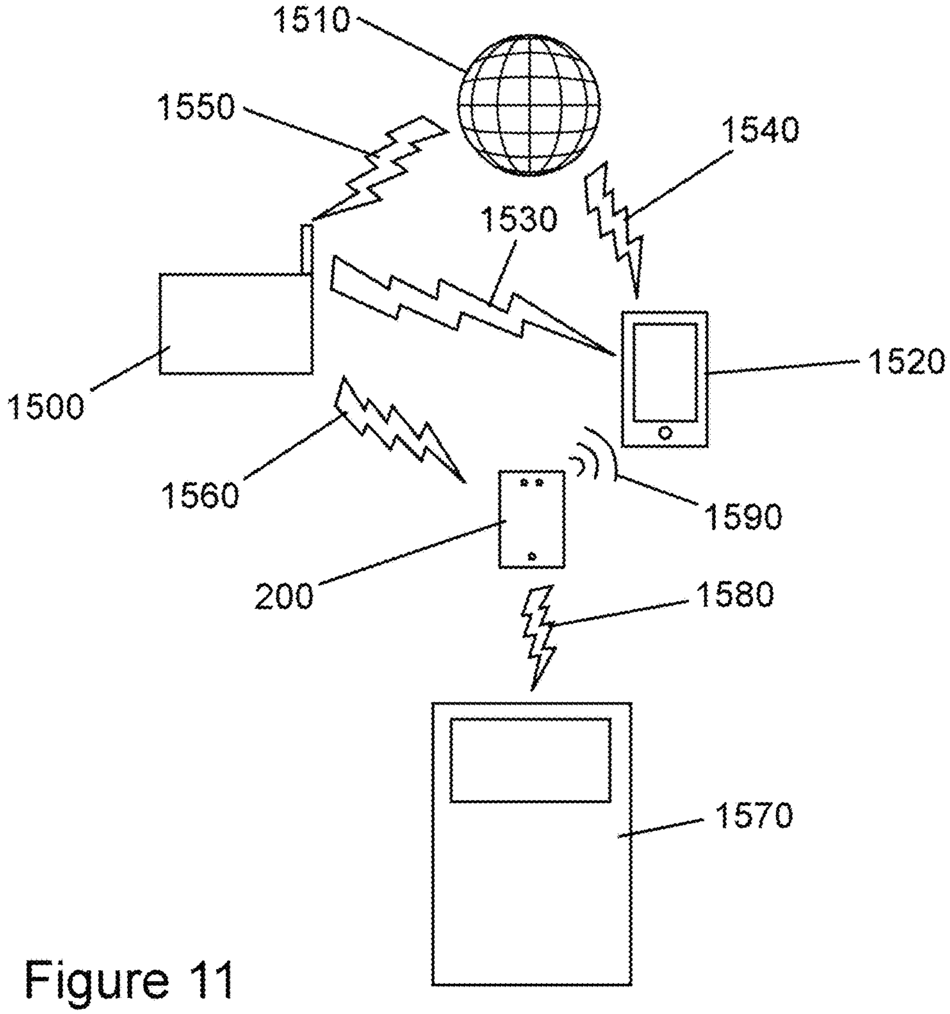
FIG. 11 illustrates a network of devices including a smart adapter.

Smart functionality for the adapter 200 is provided by a microprocessor inside the adapter that communicates with an external gateway 1500, illustrated in FIG. 11. Any suitable communications protocol between the adapter 200 and gateway 1500 may be used, but Bluetooth Low Energy (BLE) is advantageous in order to reduce power consumption at the adapter 200.

The gateway 1500 is any suitable Wi-Fi enabled device that can bridge the BLE communication from the adapter 200 to Wi-Fi protocols that are ubiquitous in home and business environments. The gateway 1500 therefore enables communication with the adapter 200 via a network 1510 such as the Internet or a local network. The gateway 1500 also enables easier management of multiple adapters and extends their control range through the network 1510. The gateway device 1500 can be connected to and powered from a mains outlet and is therefore able to power a more advanced microprocessor to run and schedule various automation programs.

The gateway 1500 connects with an online cloud server to send and receive commands over the network 1510. Commands may be sent by a user using a computing device such as a smartphone 1520 running suitable application software.

When the user issues a command locally to the gateway, the request 1530 is routed to wifi gateway 1500, which then immediately forwards the command to the adaptor 200 to achieve the quickest possible response. Commands can also be issued by a computing device non-locally, e.g. outside of the user’s home, and the computing device will route the request 1540 to the online cloud server via the Internet 1510 which will notify 1550 the W-Fi gateway 1500. The Wi-Fi gateway then relays the message 1560 via BLE to the adapter 200. A response notification can be sent back to the computing device over the same pathway in reverse, if desired. For example, if the command is to operate the switch 100 underlying the adapter 200, for example, then successful actuation triggers the sending of a notification message back to the user.

The adapter 200 can be configured with additional functionality enabling other commands to be issued. For example, the adapter 200 may be fitted with a temperature sensor and a command may be sent to request the current temperature or a stored log of past temperatures. Any other suitable sensors may be installed, such as light sensors, humidity sensors and so forth.

The adapter 200 may also be programmable to act as a universal IR remote control for controlling other devices 1570 such as audiovisual equipment, heating and cooling devices, and smart home appliances. A command signal 1580 is emitted by the IR LED 220 on the adapter 200. Other suitable control transmitters may be used instead of or in addition to IR LEDs.

The adapter 200 can be configured to operate other devices 1570 automatically based on a time setting or other sensed or received data. For example, significant energy is used in heating and cooling a home. A temperature sensor and a universal IR transmitter in the adapter enable automation of remote-controlled space heating and cooling equipment to reduce energy usage. Having a separate temperature sensor in the adapter 200 at a different location in the room rather than relying on a local sensor on a space heater or coder ensures that the equipment is operating more efficiently.

Smart devices represent a security risk if a third-party device is able to pair with the gateway 1500 or adapter 200 from a distance. Consequently, although any known method of pairing the adapter 200 with the gateway 1500 may be used, such as Near Field Communication (NFC), enhanced security for the pairing between the adapter 200 and the gateway is advantageous. Meanwhile, disadvantages of NFC include i) extra hardware cost, ii) not universally usable by mobile apps on iPhone devices. The adapter 200 uses an out of band (OOB) BLE pairing scheme using audio signals 1590 that has a range of up to only around 10 cm and is therefore secure from any attempt to pair with the gateway 1500 from a distance. The volume of the audio can be adjusted to change the effective range of communication. As shown in FIG. 5, the adapter 200 includes a low-power piezoelectric speaker 275 for generating audio signals 1590.

A two-tone key exchange system is used to enable the pairing of the gateway 1500 and the adapter 200. BLE pairing keys are the BLE microcontroller in adaptor 200 and emitted by the speaker 275 and transmitted to a handheld computing device 1520 such as a smartphone held close to the adapter 200. An application in the smartphone 1520 listens to and decodes the BLE pairing key and transmits it to the gateway 1500 via secure Wi-Fi communication to complete the BLE pairing process between the adapter 200 and the gateway.

In the two-tone key exchange system, each tone is 300 Hz apart in the range between 4400 Hz to 6800 Hz. These tones are at human audible frequencies, allowing common handheld computing devices 1520 with a built-in microphone to easily capture and interpret these tones without modification or additional hardware. Each Hex digit is represented by the first tone in the range of 4700 Hz to 5600 Hz, followed by a second tone in the range of 5900 Hz to 6800 Hz. A stop code is represented by a single tone of frequency 4400 Hz. Three stop codes indicate the start of the encoded stream, Two stop codes indicate the end of the encoded stream.

| Tone 1 frequency (Hz) | Tone 2 frequency (Hz) | Hex digit |
|---|---|---|
| — | 4400 | Stop Code |
| 4700 | 5900 | 0 |
| 5000 | 5900 | 1 |
| 5300 | 5900 | 2 |
| 5600 | 5900 | 3 |
| 4700 | 6200 | 4 |
| 5000 | 6200 | 5 |
| 5300 | 6200 | 6 |
| 5600 | 6200 | 7 |
| 4700 | 6500 | 8 |
| 5000 | 6500 | 9 |
| 5300 | 6500 | A |
| 5600 | 6500 | B |
| 4700 | 6800 | C |
| 5000 | 6800 | D |
| 5300 | 6800 | E |
| 5600 | 6800 | F |

What is claimed:

1. An apparatus for augmenting a mechanism, the mechanism having an actuator for operating the mechanism, the apparatus comprising an adapter and a connecting means;

the connecting means having a plurality of knobbed protrusions and being fixable relative to the mechanism;

the adapter comprising an actuator and a controller, wherein operation of the controller triggers the actuator of the adapter;

the adapter further having a plurality of slots corresponding with the plurality of knobbed protrusions and being securable to the connecting means by sliding the slots over the knobbed protrusions, thereby aligning the actuator of the adapter with the actuator of the mechanism in use;

the adapter further comprises at least one length of a substantially inelastic, flexible filament, wherein the filament is wound onto a spool that s connected to a motor via a worm drive; and wherein, in use when the actuator of the adapter is aligned with the actuator of the mechanism, triggering of the actuator of the adapter operates the actuator of the mechanism.

2. The apparatus of claim 1 wherein the mechanism comprises a switch and the actuator of the adapter comprises a switch actuator.

3. The apparatus of claim 2 wherein the slots are keyhole slots and the protrusions are knobbed protrusion that fit and lock into the keyhole slots.

4. The apparatus of any claim 3 wherein the mechanism is securable to a surface with screws, and wherein the connecting means comprises a plurality of adapter screws, the screws being replaceable by the adapter screws to secure the mechanism to the surface and each adapter screw having a head providing a respective one of the plurality of knobbed protrusions.

5. The apparatus of claim 4 wherein the mechanism is securable to a surface with screws, and wherein the connecting means comprises an adapter plate having a plurality of screw holes alignable with the location of the screws in the mechanism and the adapter plate is configured such that the screws can pass through the screw holes in the adapter plate and into the mechanism in use, securing the adapter plate to the mechanism and the mechanism to the surface.

6. The apparatus of claim 5 wherein the actuator of the adapter comprises a rocker actuating plate having a first end and a second end, the rocker actuating plate configured to rock between a first position and a second position when the actuator triggered, the adapter further comprising:

a first lever at the first end of the rocker actuating plate, movable to rock the rocker actuating plate to the first position; and a second lever at the second end of the rocker actuating plate, movable to rock the rocker actuating plate to the second position.

7. The apparatus of any of claim 6 wherein the actuator of the adapter comprises a slider configured to slide between a first position and a second position when the actuator is triggered.

8. The apparatus of any of claim 7 wherein the actuator of the adapter moves between a first position and a second position when the actuator is triggered.

9. The apparatus of claim 8 wherein the adapter further comprises at least one length of a substantially inelastic, flexible filament, the filament having a first end portion and a second end portion, wherein triggering of the actuator alternately causes one of the first end portion and the second end portion to tighten and the other of the first end portion and the second end portion to loosen, thereby moving the actuator of the adapter between the first position and the second position.

10. The apparatus of claim 9 wherein the filament is wound onto a spool that is configured to rotate between a first position and a second position when the actuator is triggered, thereby causing one of the first end portion and the second end portion to tighten and the other of the first end portion and the second end portion to loosen.

11. The apparatus of claim 10 wherein the spool is connected to a motor via a worm drive.

12. The apparatus of any of claim 11 wherein the adapter comprises a sensor configured to detect when the actuator of the adapter has reached either the first position or the second position following triggering of the adapter, and the adapter is configured to then stop movement of the actuator of the adapter.

13. The apparatus of claim 12 wherein the sensor comprises an infra-red LED transmitter and a corresponding receiver positioned on opposing sides of the actuator of the adapter.

14. The apparatus of claim 13 wherein the controller comprises a motion detector configured to trigger the actuator of the adapter upon detecting motion near the adapter.

15. The apparatus of claim 14 wherein the adapter is powered by an internal battery.

16. The apparatus of claim 15 wherein the adapter is configured to communicate with other devices over a network.

17. The apparatus of claim 16 further comprising a network gateway device remote from the adapter, the adapter and the network gateway device configured for wireless communication with each other, the network gateway device connectable to the network to enable the adapter to communicate with other devices over the network via the gateway.

18. The apparatus of claim 1 wherein the mechanism comprises a sliding bolt.

* * * * *